United States Patent [19]

Pareja

[11] 4,032,263

[45] June 28, 1977

[54] PUMP WITH COAXIAL INLET AND OUTLET VALVE ARRANGEMENT

[75] Inventor: Ramon Pareja, Minneapolis, Minn.

[73] Assignee: Lear Siegler, Inc., Santa Monica, Calif.

[22] Filed: Sept. 25, 1975

[21] Appl. No.: 616,553

[52] U.S. Cl. .................................. 417/539; 137/493.8
[51] Int. Cl.² .................... F04B 11/00; F16K 17/26
[58] Field of Search .......... 417/558, 454, 269, 273, 417/571, 564, 563; 137/493.8, 493.9

[56] References Cited

UNITED STATES PATENTS

| | | | |
|---|---|---|---|
| 2,462,372 | 2/1949 | Erickson | 417/571 |
| 3,180,277 | 4/1965 | Thresher | 417/269 |
| 3,257,960 | 6/1966 | Teel | 417/269 |
| 3,280,838 | 10/1966 | Parkinson | 137/493.9 |
| 3,431,865 | 3/1969 | Cook et al. | 417/273 |
| 3,666,382 | 5/1972 | Rasmussen | 417/533 |

Primary Examiner—William L. Freeh
Attorney, Agent, or Firm—Orrin M. Haugen

[57] ABSTRACT

A unitary inlet and outlet valve means for fluid flow control comprising a unitary body in the form of a hollow sleeve having coaxially arranged inlet and outlet valves. The sleeve housing means includes an inlet at one end thereof, and a flow chamber at the opposed end thereof, and with an annular flange extending outwardly from the sleeve adjacent the flow chamber. The central bore through the sleeve member provides a housing and seat for the inlet poppet, and an annular spring-biased ring controls fluid flow through bores formed in the flange and communicating between the flange and the flow chamber. The individual valves open upon opposed inwardly directed movement, thereby shortening the overall length of the valve body.

4 Claims, 4 Drawing Figures

PUMP WITH COAXIAL INLET AND OUTLET VALVE ARRANGEMENT

BACKGROUND OF THE INVENTION

The present invention relates to a unitary inlet and outlet valve for controlling the flow of fluids to and from a pumping chamber having alternate suction and pressure strokes or cycles, and more particularly to an improved unitary inlet and outlet valve means which is compact, reliable, and easily assembled and serviced.

A wide variety of valve structures including unitary inlet and outlet valves have been in use over the years. Frequently, because of the design, these valves have been relatively large in size, either in diameter or length, and have normally required areas or zones which function on an exclusive basis for either the inlet function or the outlet function. The structure of the present invention provides zones of dual-function, thereby reducing the overall size requirement, and furthermore employs poppet opening motion which is in inwardly-opposed directions, thereby reducing the overall length requirement for the structure. For enhancing assembly and serviceability, snap-rings are employed as base members for the compression springs employed in both inlet and outlet poppets.

SUMMARY OF THE INVENTION

Briefly, in accordance with the present invention, the unitary inlet and outlet valve means employs a generally cylindrical sleeve body member with an inlet arranged at one end and a flow chamber at the opposed end. An annular flange extends radially outwardly from the sleeve body member adjacent the flow chamber end, with bores being formed through the flange and are in communication with the flow chamber portion of the valve. The surface of the radially outwardly extending flange provides a seat for the annular poppet, and, as indicated, a snap-ring is employed to provide the ultimate base for the compression spring which is utilized to normally bias the annular poppet. The inlet poppet seats on an inclined shoulder which extends inwardly from the termination of the counterbore, and a snap-ring member is provided and utilized for a base against while the inlet poppet compression spring may rest. Of course, appropriate spider means or the like are employed to properly retain the inlet poppet compression spring in proper disposition.

Therefore, it is a primary object of the present invention to provide an improved unitized inlet and outlet valve means for controlling the flow of fluids to and from a pumping chamber having alternate suction and pressure cycles, and wherein the valve means has coaxially arranged inlet and outlet poppets, and wherein snap-ring means are utilized to provide a base for the compression springs utilized to normally bias the poppets in position.

It is a further object of the present invention to provide an improved unitized inlet and outlet valve means which controls flow of fluids to and from a pumping chamber having alternate suction and pressure cycles, and wherein the inlet and outlet poppets are coaxially arranged and are actuated from their normal seated positions in opposed inwardly extending directions.

It is yet a further object of the present invention to provide an improved inlet and outlet valve means for controlling the flow of fluids to and from a positive displacement piston pump having alternate suction and pressure strokes, and wherein the valve means is compact, both in diameter and axial length.

Other and further objects of the present invention will become apparent to those skilled in the art upon a study of the following specification, appended claims, and accompanying drawings.

DESCRIPTION OF THE PREFERRED EMBODIMENT

Figure 3:
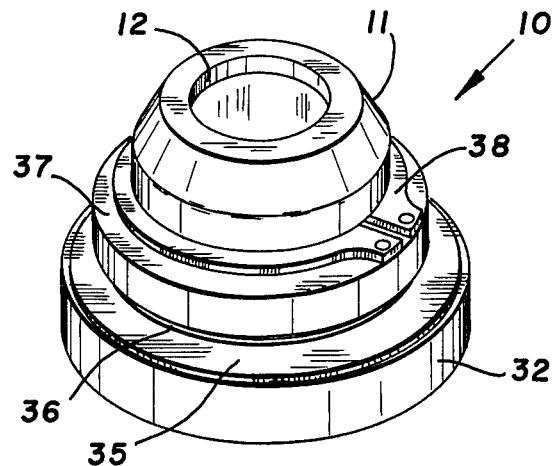
FIG. 3 is a detailed perspective view on a slightly enlarged scale of the unitary inlet and outlet valve means of the present invention.
Figure 4:
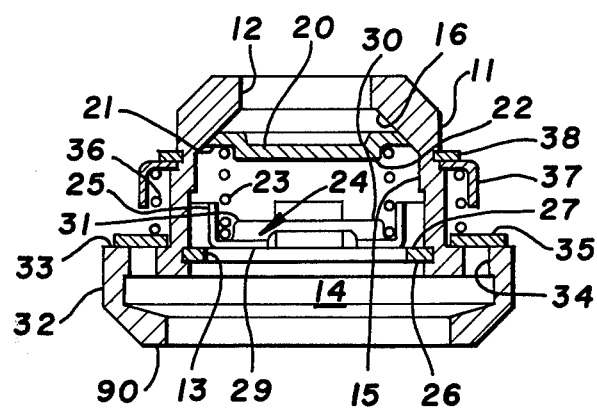
FIG. 4 is a vertical sectional view taken through the diameter of the unitary inlet and outlet valve means illustrated in FIG. 3, and being drawn to the same scale as FIG. 3.

In accordance with the preferred modification of the present invention, and with particular attention being directed to FIGS. 3 and 4 of the drawings, the unitary inlet and outlet valve means generally designated 10 includes a sleeve body member 11 having an inlet port 12 at one end thereof, an outlet port 13 generally intermediate the ends of the body member 11, and a flow chamber shown generally at 14 in opposed relationship to the inlet 12. As will be apparent, body member 11 is provided with a bore forming the inlet 12, with a counterbore as at 15 extending from the flow chamber end of the valve and terminating in an angularly disposed shoulder 16.

Referring initially to the inlet portion of the structure, poppet 20 is provided with a seating surface 21 which seats against the surface of angularly disposed shoulder 16. The inner surface 22 of poppet 20 is in contact with compression spring 23, spring 23 providing the compressive force necessary to normally retain poppet 20 in seated disposition against its seat along angularly disposed shoulder 16. Spring 23 rests upon the inner surface of cup-shaped spider member 24, member 24 having an axially extending flange surface as at 25 for radially positioning spring 23. Snap-ring 26 is arranged for positioning in an internal annular groove, with the inner edge of the snap-ring 26 extending inwardly from counterbore 15 to form an annular base pad as at 27. As is apparent in the view of FIG. 4, cup-shaped spider member 24 utilizes radially extending arms such as arm member 29, and for additionally supporting spring 23 in proper radial disposition, projection 30 is provided, with the edge of projection 30, as at 31, providing an inner guide for compression spring 23.

The outlet of valve 10 is likewise simple in construction. Annular flange 32 extends outwardly from sleeve body member 11, and is accordingly provided with a seating surface 33 therearound. Bores such as the bore 34 are provided through the flange, and provide communication between the exterior of the unitary valve 10 and flow chamber 14. Annular poppet 35 is arranged in seating disposition on seat surface 33, with compression spring 36 being utilized to normally retain poppet 35 in place on seat 33. A flanged retainer member 37 is utilized to control the radial disposition of spring 36, and snap-ring 38 is utilized as an annular base pad for member 37. It will be appreciated that snap-ring 38 has an annular portion extending radially outwardly from the sleeve body member 11 so as to form the annular base pad. Therefore, the annular poppet valve ring 35 is disposed coaxially about the outer periphery of sleeve body member 11, seated against the upper surface of flange 32.

Figure 2:
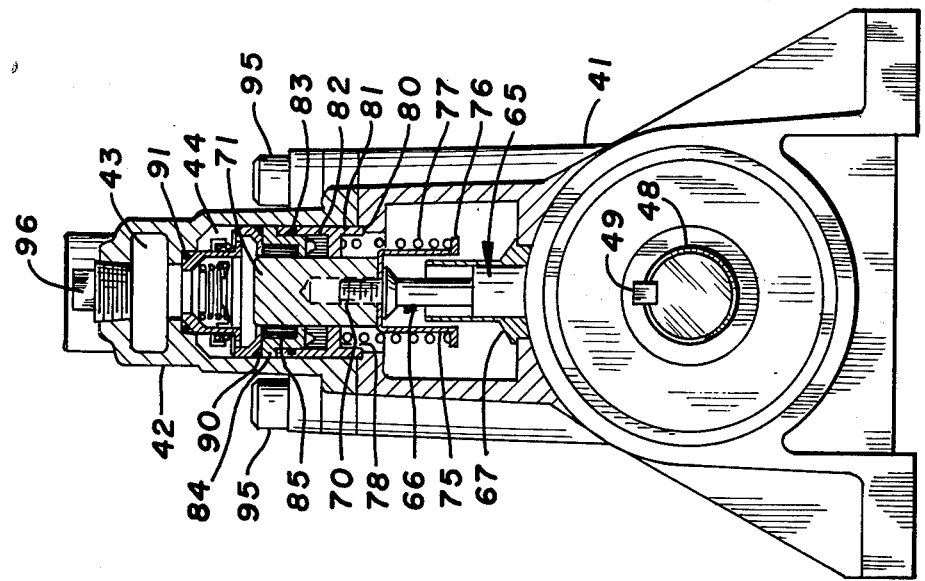
FIG. 2 is a vertical sectional view taken along the line and in the direction of the arrows 2—2 of FIG. 1, and illustrating the unitary inlet and outlet valve means in working disposition within the pump structure.
Figure 1:
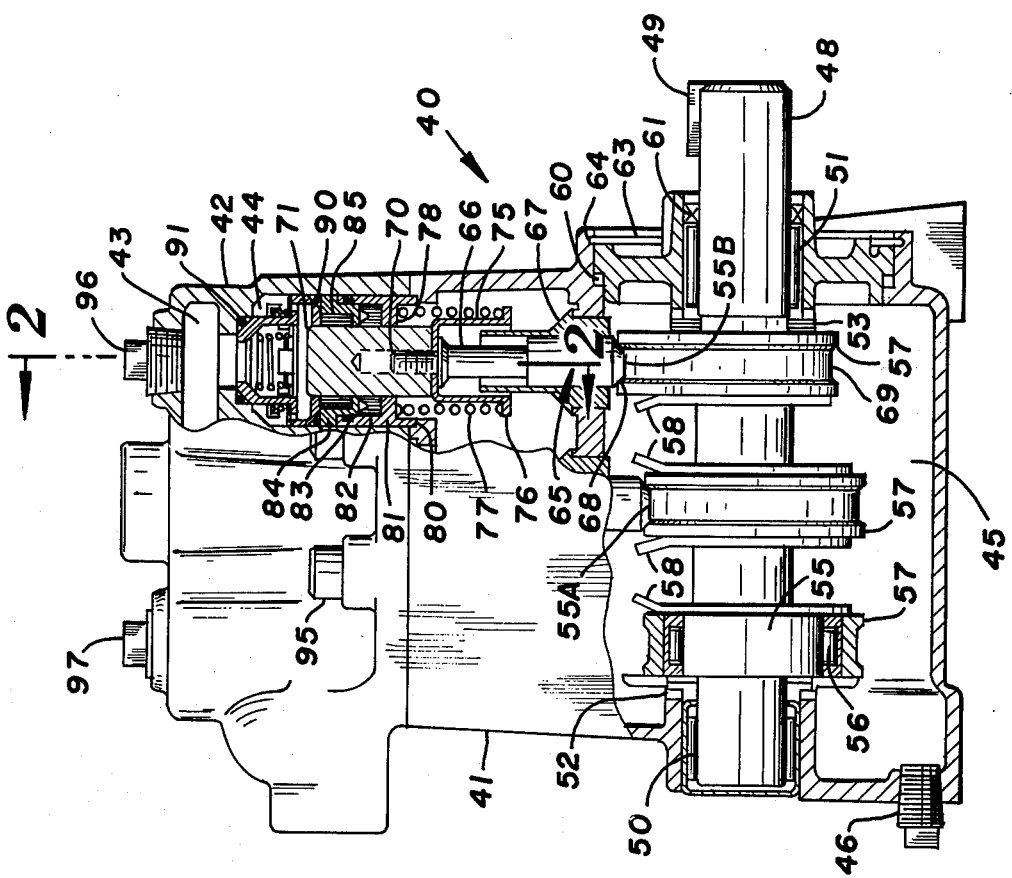
FIG. 1 is a side elevational view, partially broken away, and illustrating a conventional piston pump employing, in combination, the unitary inlet and outlet valve means of the present invention, with the crankcase and one cylinder being cut away so as to expose the details of the assembly.

Turning now to the environment of operation, as illustrated in FIGS. 1 and 2, the pump assembly generally designated 40 includes a crankcase body 41 along with a cylinder head body 42. Cylinder head 42 is provided with chambers therewithin, and including the inlet chamber 43 and the outlet chamber 44. Crankcase 41 is enclosed so as to provide a lubricating retaining zone as at 45, crankcase lubricant being drained by means of the threaded drain plug 46. Referring initially to the drive portion of the pump 40, crank shaft 48, having a key as at 49 is journaled for rotation within closed main bearing 50 and open main bearing 51. As appropriate, thrust bearings are provided as at 52 and 53. Axially spaced eccentrics are provided along crank shaft 48, such as at 55, with a radially offset eccentric member being likewise provided for the remaining two cylinders. Obviously, the lobes will be disposed at 120° from each other. Each of the lobes such as lobes 55A and 55B are provided with a cam bearing as at 56, with bearing 56 supporting a connecting rod member 57 thereon. Retainers 58—58 are provided to retain cam bearings and their associated connecting rods in proper axial disposition, with retainer 58—58 being seated in grooves formed along the crank shaft 48 adjacent each of the individual cam lobes.

As will be appreciated, appropriate seals will be provided for the drive mechanism and the associated crankcase, such as at 60 wherein an O-ring seal is provided. An internal seal is also provided as at 61. The crank shaft assembly is appropriately held in place by means of expandable retainer ring 63, which fits within groove 64 of crankcase body 41.

Turning now to the remaining portions of the assembly, a piston assembly generally designated 65 is illustrated, with the piston assembly including elongated plunger member 66 received within roller guide or oil seal member 67. Base 68 of piston assembly 65 rides in the grooved area of the associated annular connecting rod member such as at 69, the base portion 68 being tapered inwardly as is illustrated in FIG. 1. Piston assembly 65 terminates at the upper portion in threaded stud member 70 coupling plunger 71 thereto.

Inverted cup 75 is retained in place on piston assembly 65, as illustrated, and is provided with a flanged member 76 for engaging return spring member 77. Spring member 77 is held in compression between surface 78 of cylinder head 42 and the upper surface of flange 76, thereby providing the force required to maintain surface 68 in substantially continuous running contact with the drive surface 69 of annular connecting rod 57. Cylinder head 42 is further bored to provide a retaining flange as at 80 for holding and retaining the seal and guide stack arrangement. The seal and guide stack arrangement includes a cup retainer 81 which rests on the shoulder of flanged surface 80, and supports the U-shaped cup member 82 for sealing engagement with plunger 71. If desired, an O-ring may be provided within U-cup 82, and in addition, O-ring 83 may be provided between guide retainer 84 and cup retainer 81. A piston guide, typically of the graphite type, is provided at 85.

Turning now to the manner in which unitary inlet and outlet valve means 10 is retained in place, the base surface 90 (see FIG. 4) of valve 10 rests upon the upper surface of guide retainer 84, with O-ring 91 being utilized to provide appropriate sealing. The upper surface of plunger 71 enters the lower portion of valve 10, that is, into flow chamber 14, on its upper extremity of reciprocatory motion. Suitable bores are provided within cylinder head 42 along with seals as at 91, for completing the mounting and retention of valve 10 in place.

It will be appreciated, therefore, that unitary inlet and outlet valve means are provided which are compact, straightforward, and durable. The valve means may be employed with any reciprocating pump, including plunger type, piston type, or the like. Other applications calling for inlet and outlet valve means may also be satisfied with the structure of the present invention.

As is conventional in structures of this type, conventional means of retaining the cylinder head 42 on crankcase body 41 may be employed, such as by means of the cap screws 95—95. Access to the inlet chamber 43 may be achieved through the threaded plug members 96 and 97.

The valve structure as defined in the present invention may, of course, be utilized in any of a wide variety of pump structures having a pumping chamber with alternate suction and pressure cycles. The present embodiment is illustrated in a pump structure similar to that shown in U.S. Pat. Nos. 3,666,382 and 3,747,478, with the application of the valve to these structures being appropriate.

I claim:
1. Unitary inlet and outlet valve means for controlling flow of fluids to and from a pumping chamber having alternate suction and pressure cycles and comprising:
   a. housing means including a generally cylindrical sleeve body member with an inlet at one end and a flow chamber at the opposed end thereof and having an annular flange extending outwardly from said sleeve body member and generally enclosing said flow chamber, a bore formed within said sleeve body member and extending axially therethrough and a counterbore formed within said sleeve body member and terminating along an annular shoulder; with said flow chamber being disposed within said annular flange, and with said annular flange having spaced apart radially inwardly extending portions at opposed axial ends of said flow chamber and including first and second annular base surfaces with said first annular base surface being at the end of said housing means adjacent said flow chamber and forming one end wall thereof;
   b. a first annular groove formed around the periphery of said counterbore at a point axially spaced from said flow chamber toward said inlet and having a first generally resilient snap-ring means received therewithin with the inner edge of said snap-ring means extending inwardly from said counterbore to form a first annular base pad;

c. a poppet valve seated against said annular shoulder, a cup-shaped spider means having radially outwardly extending arms seated upon the upper end of said first snap-ring means, a first valve spring disposed within said counterbore with one end of said first valve spring being seated against said spider means and the opposed end against the inner surface of said poppet valve;

d. said annular flange having a plurality of bores formed through a second annular base surface opposed from said first annular base surface, with said bores being in communication with said flow chamber adjacent the lower end of said first snap-ring means, an annular valve ring disposed coaxially about the outer periphery of said sleeve body member and seated against the upper surface of said flange to seal said flange bores;

e. a second annular groove formed about the outer periphery of said sleeve body member, a second snap-ring means disposed within said second annular groove and having a portion extending radially outwardly of said sleeve body member to form a second annular base pad, and second valve spring means being disposed and compressed between said second annular base pad and said annular valve ring.

2. The unitary inlet and outlet valve means as defined in claim 1 being particularly characterized in that said annular flanged spring retainer is disposed between said second valve spring and said second annular base pad.

3. The unitary inlet and outlet valve means as defined in claim 1 wherein said flow chamber is adapted to receive a portion of a reciprocating pumping member therewithin.

4. The unitary inlet and outlet valve means as defined in claim 1 wherein said spider means is formed with a valve spring guiding projection centrally thereof.

* * * * *